United States Patent
Brough et al.

(10) Patent No.: US 7,648,162 B2
(45) Date of Patent: Jan. 19, 2010

(54) TUBULAR GAS GUIDE ELEMENT, GAS GENERATION AND FEED UNIT AND CURTAIN AIRBAG UNIT

(75) Inventors: Matthew Brough, Staffordshire (GB); Douglas McGregor, Haslington (GB); Hakan Jaconelli, Alingsas (SE); Alan Bradburn, Staffordshire (GB)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/849,628

(22) Filed: Sep. 4, 2007

(65) Prior Publication Data

US 2008/0224457 A1    Sep. 18, 2008

Related U.S. Application Data

(63) Continuation of application No. PCT/EP2006/001584, filed on Feb. 22, 2006.

(30) Foreign Application Priority Data

Mar. 2, 2005    (DE) .................. 10 2005 009 432
Mar. 2, 2005    (DE) .................. 10 2005 009 433

(51) Int. Cl.
    *B60R 21/021* (2006.01)
(52) U.S. Cl. .................................................. 280/730.2
(58) Field of Classification Search ............. 280/730.2, 280/728.1, 740
    See application file for complete search history.

(56) References Cited

U.S. PATENT DOCUMENTS

| | | | |
|---|---|---|---|
| 6,260,878 B1 * | 7/2001 | Tanase | 280/730.2 |
| 6,273,456 B1 * | 8/2001 | Heigl | 280/730.2 |
| 6,312,010 B1 * | 11/2001 | Heigl | 280/730.2 |
| 6,334,625 B1 * | 1/2002 | Pausch et al. | 280/729 |
| 6,375,214 B1 * | 4/2002 | Nishikaji | 280/728.2 |
| 6,450,529 B1 * | 9/2002 | Kalandek et al. | 280/730.2 |
| 6,530,595 B2 * | 3/2003 | Masuda et al. | 280/730.2 |
| 6,962,364 B2 * | 11/2005 | Ju et al. | 280/730.2 |
| 7,331,602 B2 * | 2/2008 | Ochiai et al. | 280/730.2 |
| 7,422,231 B2 * | 9/2008 | Kismir et al. | 280/728.1 |
| 7,422,233 B2 * | 9/2008 | Bradburn | 280/730.2 |
| 2003/0090093 A1 * | 5/2003 | Ikeda et al. | 280/730.2 |
| 2003/0218324 A1 * | 11/2003 | Ju et al. | 280/743.1 |

FOREIGN PATENT DOCUMENTS

| | | |
|---|---|---|
| JP | 2002-187519 A | 7/2002 |
| WO | WO 02/079008 | 10/2002 |

\* cited by examiner

*Primary Examiner*—Paul N. Dickson
*Assistant Examiner*—Timothy Wilhelm
(74) *Attorney, Agent, or Firm*—Brinks Hofer Gilson & Lione

(57) ABSTRACT

A tubular gas guide element for a side curtain airbag for guiding gas coming from a gas generator comprising at least two layers of fabric. With the use of such a gas guide, thrust of the gas inflowing into an airbag can be balanced.

20 Claims, 5 Drawing Sheets

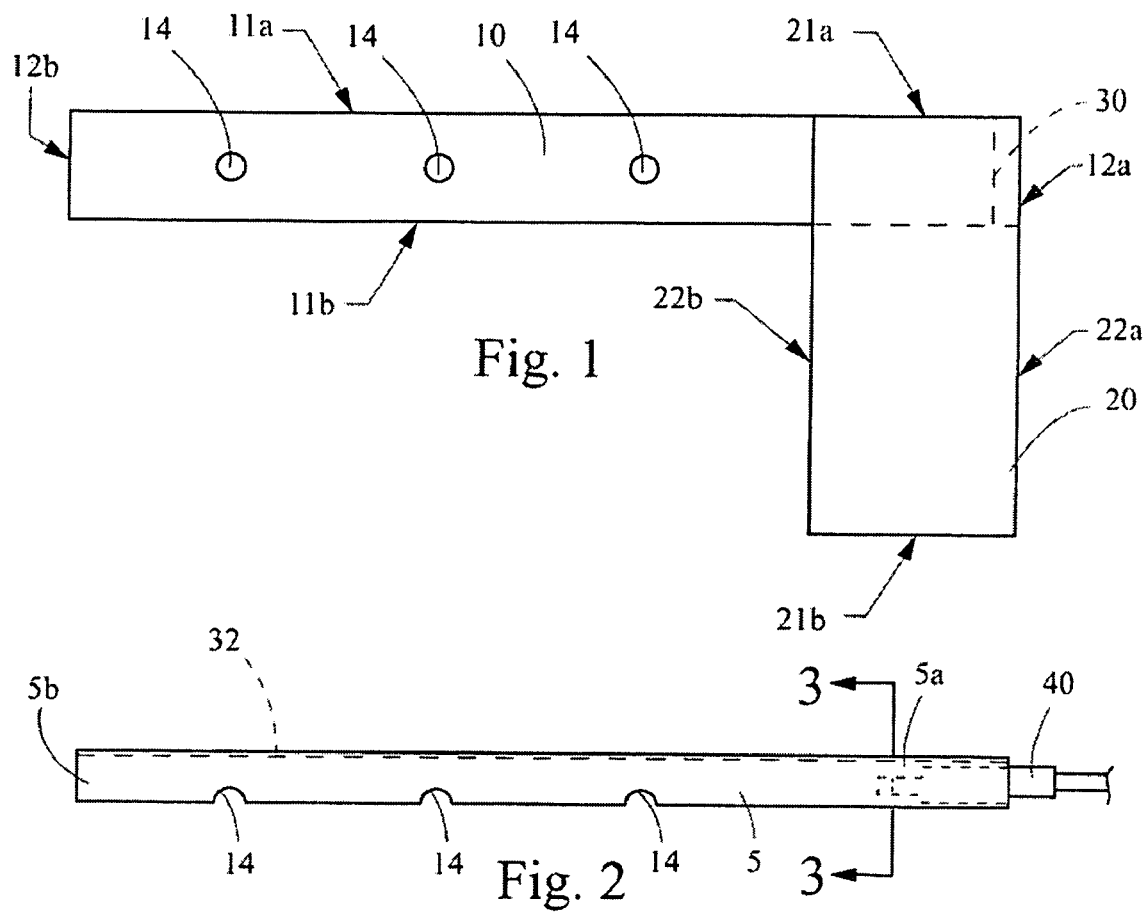

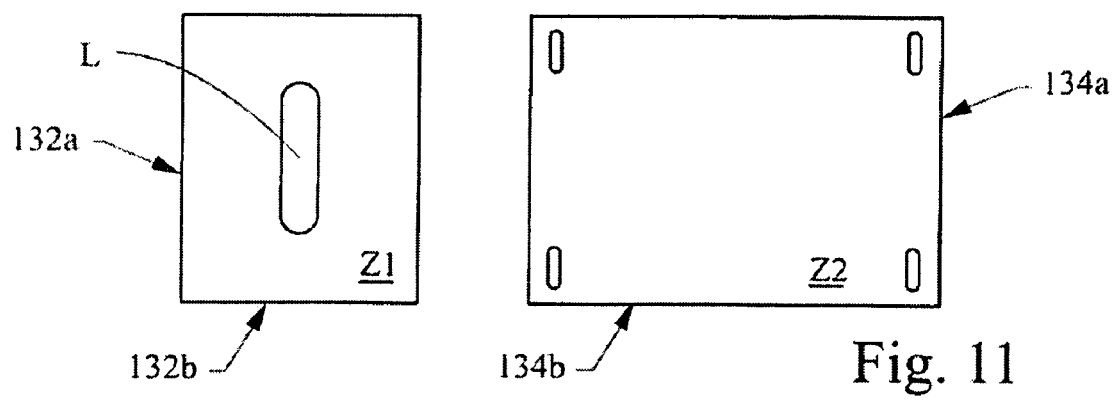
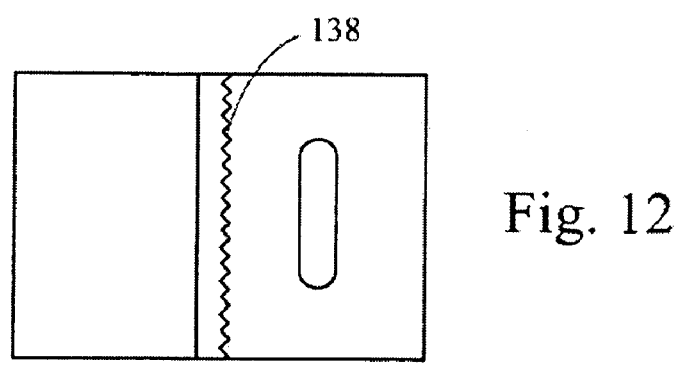
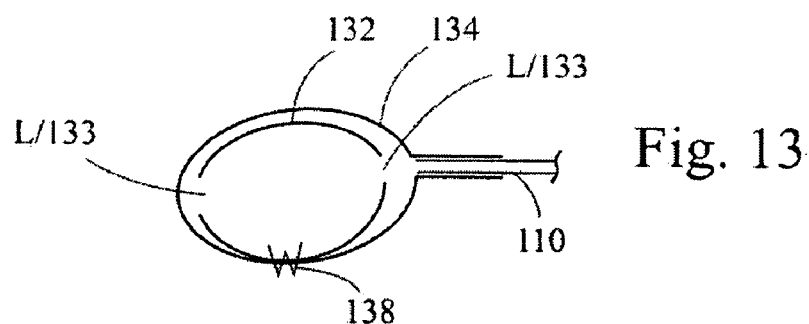
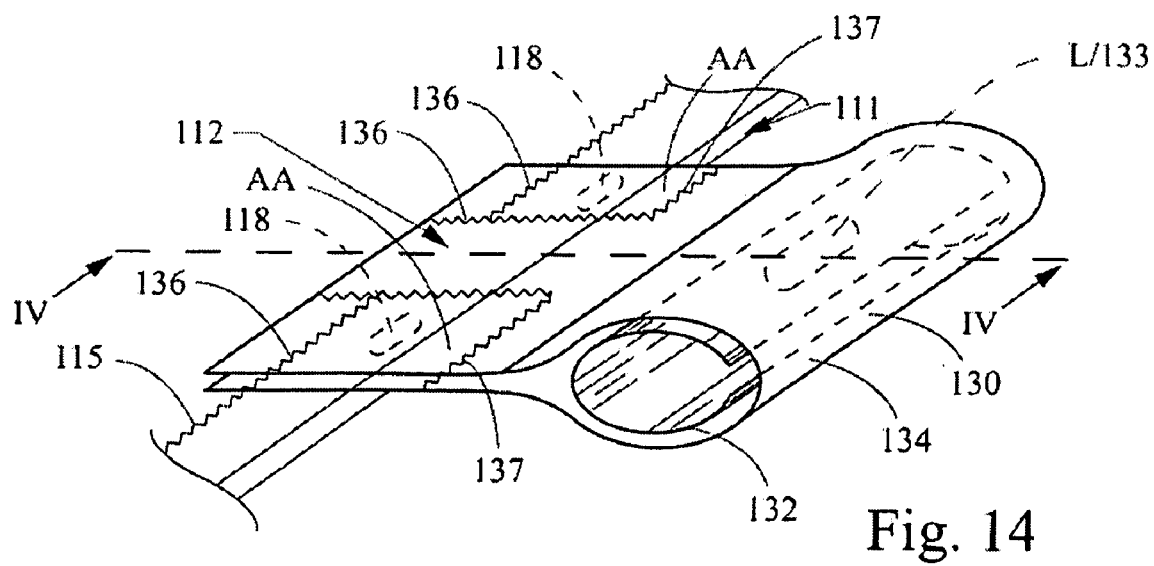

TUBULAR GAS GUIDE ELEMENT, GAS GENERATION AND FEED UNIT AND CURTAIN AIRBAG UNIT

CROSS REFERENCE TO RELATED APPLICATIONS

This application claims priority to PCT Patent Application PCT/EP2006/001584 filed Feb. 22, 2006 and DE Patent Applications 10 2005 009 433.3 and 10 2005 009 432.5 which were both filed on Mar. 2, 2005.

FIELD OF THE INVENTION

The invention relates generally to an airbag system for a motor vehicle and more specifically to a curtain airbag system including several of its elements.

BACKGROUND OF THE INVENTION

So-called side curtain airbags are known in vehicle technology. These airbags are located in the area of the side roof rail of a motor vehicle and expand in front of the side windows and possibly the B-pillar of a motor vehicle in case of need. Such a curtain airbag by its nature exhibits a relatively large basic area. This large area results in the problem of evenly discharging the gas emerging form a single gas generator into the airbag.

A curtain airbag unit exhibits a large-surface airbag skin and a gas generator for filling of the airbag skin. The airbag skin typically has an upper edge, which is fixed in the area of the roof rail of the motor vehicle, so that the longitudinal direction of the airbag extends along the longitudinal axis of the vehicle. Filing preferably occurs from the upper edge. Two concepts are currently used for this result.

In the first concept, the gas generator is located on one of the two ends of the upper edge (generally the rear end), and a long, thin metal lance forming several outlet openings extends from the gas generator into the inside of the airbag skin, said metal lance distributes the gas over the length of the airbag skin.

In a second concept, the airbag skin exhibits an accommodation area for the gas generator in the area of the upper edge between the front and the rear end, which extends into the inside of the airbag skin or which is at least connected with the inside. For this purpose the accommodation area can be L-shaped, for example.

If, according to the first concept, gas guide elements in the form of metal tubes are used, at least two disadvantages result: on the one hand such tubes are relatively thin in relation to their length, which makes them very susceptible to damage and therefore there are considerable transport costs involved during transport from the manufacturer to the site of final assembly. Furthermore, the assembly unit of gas generator and gas guide element is not thrust neutral and therefore constitutes a risk.

Therefore, the suggestion has already been made to manufacture gas guide elements of fabric. A gas guide element made of fabric is described, for example in JP 2002-187519 A.

One problem in the use of tubular gas guide elements made of fabric is that if cylindrical gas generators which are thrust neutral are used, the hot gas first strikes directly against the inner walls of the fabric tube. This can lead to failure of the material and therefore to faulty function of the airbag.

In the second concept, the following problem occurs: generally, cylindrical gas generators are used which are formed so as to be thrust neutral for reasons of safety. This means that the gas outlet openings are arranged so as to be rotationally symmetrical on a part of the jacket surface of the gas generator. Without additional measures there would be the problem that airbag fabric would be directly subjected to the stream of the hot gases and would possibly be damaged. Therefore deflectors are used which protect the airbag fabric against the outflowing gas.

Such a deflector, implemented in the form of a U-shaped metal sheet, is known from patent WO 02/079008 A1. Furthermore, a gas guide element made of fabric which is sewn into the airbag skin is known from this publication.

A disadvantage of such a deflector element is that the airbag unit, when finally assembled and complete, does not behave in a manner which is thrust neutral. Namely, if the airbag becomes overheated due to a thrust imbalance, the airbag skin consisting of plastic fabric material may become burned.

SUMMARY OF THE INVENTION

The present invention seeks improving a tubular gas guide element, a gas generation and feed unit consisting of such a tubular gas guide element and a gas generator, and a side curtain airbag unit in such a way that both a high degree of functional safety and also thrust neutrality are ensured.

In at least one embodiment of the present invention, a gas first streams from a gas generator into a gas guide element or deflector element completely consisting of fabric. This is formed of at least two layers, whereby the inner layer protects the outer layer and in particular covers joining lines such as seams, bonding or welding lines which reach into the surroundings outside the gas chamber of the airbag.

In one aspect of the invention, the tubular gas guide element comprises at least two fabric cuttings where a first fabric cutting forms a tubular outer skin. Inside the tube formed of the first fabric cutting, a second fabric cutting is located, which at least covers the area in which the two longitudinal edges of the first fabric cutting are connected with each other. Namely, it has been discovered that the critical area of a gas element made of fabric is the area in which gas strikes radially against a seam.

Advantageously, the two fabric cuttings are rectangles, which are first joined to form an "L". Then the gas generator is wound into the second cutting which lies uppermost; finally the two longitudinal edges of the first fabric cutting are joined together, preferably sewn. This means that the second cutting which preferably completely surrounds the gas generator, does not exhibit a seam at least in the area of the outflow opening of the gas generator, so that direct flow of gas onto a seam in the area of the outflow openings is avoided.

In at least one other embodiment of the present invention, the deflector element of an airbag element also is made, preferably completely, of fabric and therefore burns up together with the airbag skin in case of fire, or deterioration of strength, so that the gas can escape from the thrust-neutral gas generator directly into the environment. Like the gas generator, the deflector element is formed as a cylinder, such as for example, by being folded to a cylinder from a flat fabric cutting and held together by a first connecting line, which is mostly in the form of a connecting seam. The deflector element is connected with the airbag skin by means of a fixing seam. In order to guarantee sufficient resistance capacity over the period when the gas is flowing out, the deflector element is formed in two layers, with an inner and outer layer. Here, the inner layer covers the first connecting line.

BRIEF DESCRIPTION OF THE DRAWINGS

Advantageous embodiments result from the subclaims and from the embodiments explained below in relation to the drawings. The drawings are as follows:

FIG. 1 is a first and a second fabric cutting, which are connected together to form an L;

FIG. 2 is a gas guide element with a gas generator accommodated in it;

FIG. 3 is a section along Line A-A from FIG. 2;

FIG. 11 is fabric cuttings for an inner and an outer layer of a deflector element according to a second example;

FIG. 12 is the two fabric cutting from FIG. 6, which are connected with one another by means of a connecting seam;

FIG. 13 is a section through the deflector element according to a second embodiment; and FIG. 14 is a deflector element and an airbag skin according to a second embodiment in a perspective view.

DETAILED DESCRIPTION

In at least one embodiment of the present invention, a tubular gas guide element basically extends over the entire length of the curtain airbag and the gas generator is located proximate one end of the curtain airbag and preferably outside of the airbag.

Figure 5:
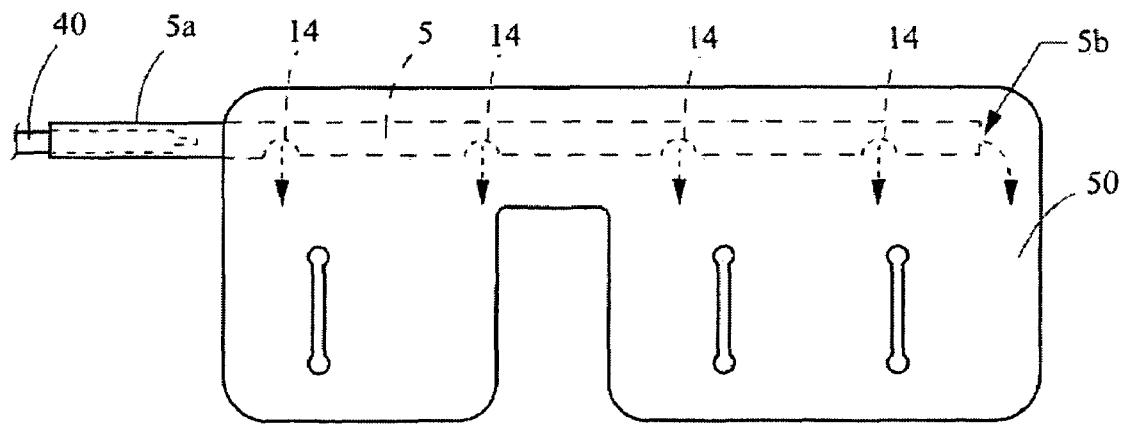
FIG. 5 is a schematic representation of a curtain airbag unit.

FIG. 5 illustrates a side curtain airbag unit. This consists of a curtain airbag 50, the gas generator 40 and the tubular guide element 5, in whose first end 5a gas generator 40 is accommodated. If gas generator 40 is actuated, gas streams into tubular gas guide element 5 and streams out of its second end 5b and through holes 14 out of tubular gas guide element 5 and into the inside of curtain airbag 50.

Tubular gas guide element 5 may be made of fabric. In one aspect, it may be manufactured of two fabric cuttings 10,20, as illustrated in FIGS. 1,2 and 3. Both fabric cuttings 10,20 are rectangles with first edges 11a,b, second edges 12a,b, third edges 21a,b, and fourth edges 22a,b. First edges 11a,b of first fabric cuttings 10 are the longitudinal edges of this fabric cutting. They are generally considerably longer than second edges 12a,b. In addition, through holes 14 are inside the first fabric cutting 10.

In a first assembly step, the second fabric cutting 20 is fastened to the first cutting 10. This can be done, for example, by means of the assembly seam 30. As can be seen, the first third edge 21a of the second fabric cutting 20 is co-linear in relation to first edge 11a of the first fabric cutting 10. In the same way, first fourth edge 22a is in some sections co-linear to first second edge 12a of the first fabric cutting 10. The two fabric cuttings connected together therefore form an "L".

Figure 4:
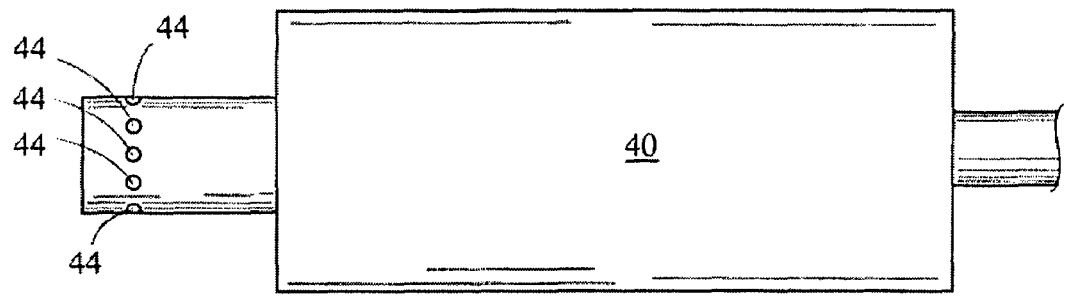
FIG. 4 is a schematic representation of a gas generator.

In the second assembly step, a gas generator 40, as shown in schematic form in FIG. 4, is wound into the second fabric cutting 20. As third edges 21a,b of second fabric cutting 20 are longer than second edges 12a,b of first fabric cutting 10, the jacket surface of the section of gas generator 40 which projects into guide element 5 is completely surrounded by second fabric cutting 20, so that there is no contact between gas generator 40 and first fabric cutting 10.

Finally, first fabric cutting 10 is laid together so as to form a tube and first edges 11a,b are connected to each other by means of connecting seam 32. This is done in a way that first fabric cutting 10 is turned over or folded such that through sewing by means of connecting seam 32, the first surface 15 of first fabric cutting 10 in some sections comes into contact with itself. In the area of the first end 5a of tubular gas guide element 5, first third edge 21a of second fabric cutting 20 is accommodated between the two first edges 11a,b of the first fabric cutting 10. Alternatively, the second fabric cutting can be fixed to the first fabric cutting by means of the assembly seam.

The items illustrated in FIGS. 2 and 3 result from this assembly process where FIG. 3 is a section along plane A-A from FIG. 2. As can be seen from FIG. 3, the connecting area between first edges 11a formed by connecting seam 32 is, in the area of the gas generator, completely covered by the second fabric cutting 20. The second third edge 21b of second fabric cutting 20 may be located without a seam inside the tubular gas guide element 5, so that the gas coming radially from the outflow openings 44 of gas generator 40 does not strike a seam.

As an alternative to the assembly process described above, it can be advantageous first to connect the first and second fabric parts 10,20 with one another in the manner described, and then to connect gas generator 40 with first end 5a of the gas guide element. This makes it possible to avoid a sewing process with the gas generator inserted.

The invention was described here in relation to a curtain airbag; however it is clear that a tubular gas guide element according to the invention can also be used with another type of airbag, for example a side airbag.

In at least one other embodiment of the present invention, a gas generator is basically located proximate the middle of the upper edge of a curtain airbag. With this arrangement, at least the outflow area of the gas generator is surrounded by a deflector element which consists of at least two layers made of fabric.

Figure 6:
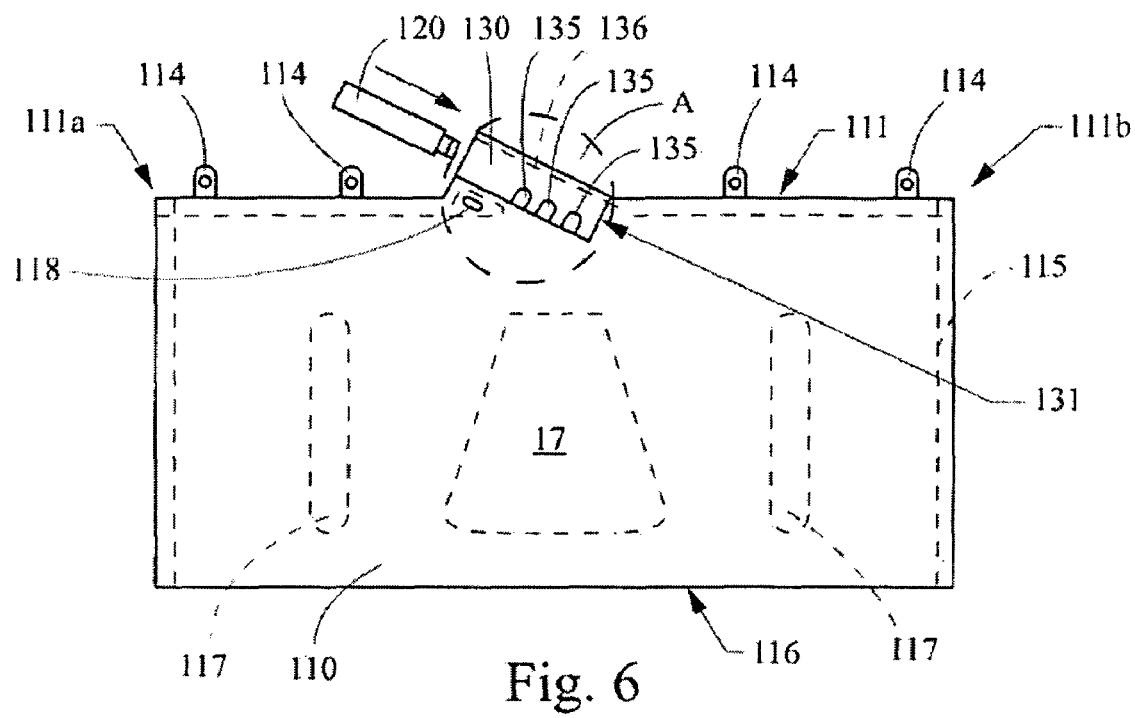
FIG. 6 is a longitudinal section through a curtain airbag unit according to a first example.

FIG. 6 illustrates in a longitudinal section, a first embodiment of the gas generator located proximate the middle of the upper edge of the curtain airbag. The curtain airbag unit exhibits an airbag skin 110 with an upper edge 111, on which are located fixing tabs 114 for fixing of the airbag skin in a vehicle structure. The airbag skin 110 may be manufactured of a one-piece fabric cutting, which is folded at lower edge 116 and which is stitched to itself by means of circumferential seam 115. Airbag skin 110 provides non-inflatable areas 117, which are separated from the gas chamber by means of separating seams.

Upper edge 111 extends from rear end 111a to front end 111b. In the area of the upper edge 111 between rear end 111a and front end 111b, proximate the middle, the accommodation area A for gas generator 120 (shown here in non-assembled state) is provided. In accommodation area A there is: also the fixing opening 118, through which a hose clamp can be guided, by means of which gas generator 120 is clamped to airbag skin 110.

Deflector element 130, preferably made of fabric, is located in the accommodation area and is sewn to the airbag skin by means of fixing seam 136. In this area, fixing seam 136 may be congruent with circumferential seam 115. Deflector element 130 is of tubular form with two open end sides and, at least when the cylindrical gas generator is mounted, forms a cylindrical body. The gas streams in an axial gas stream and a radial gas stream into the gas chamber of the airbag skin through front end side 131 and radial through holes 135. The deflector element 130 therefore also fulfils the further task of a gas guide element.

In the sewn state, but not yet mounted in the vehicle, the positioning axis of the cylindrical deflector element, which in this embodiment extends inside airbag skin 110 and underneath upper edge 111, is inclined in relation to upper edge 11 of airbag skin 110. On the one hand, this has the advantage that the fabric cutting for the airbag skin can exhibit a simple geometry. In addition, advantages can accrue from this with regard to force transmission when the gas generator is activated.

Figure 7:
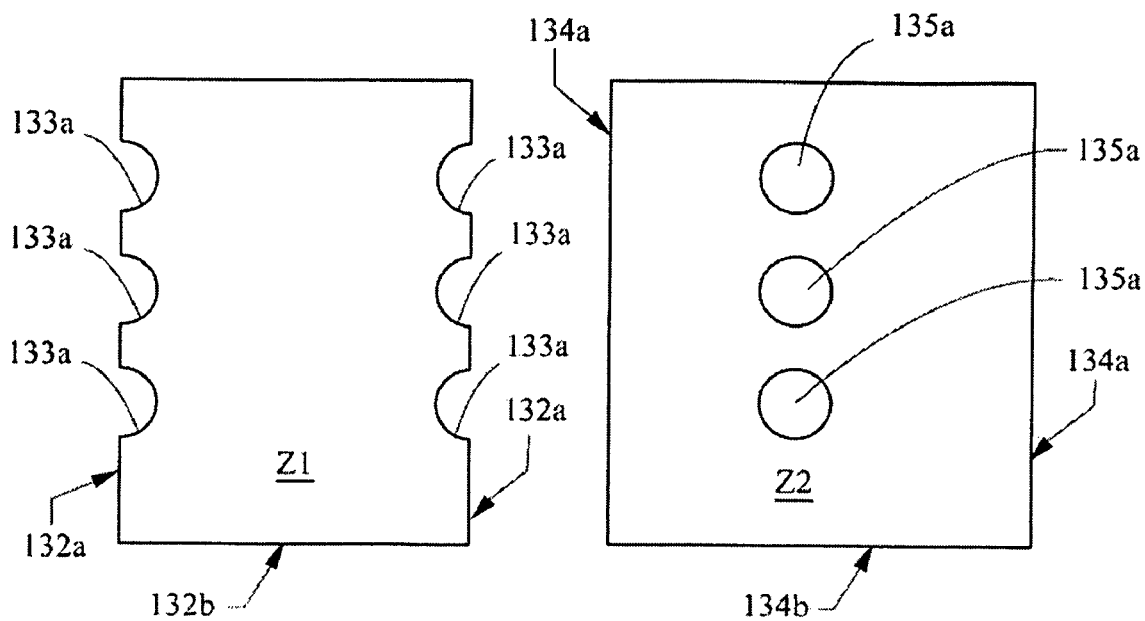
FIG. 7 is fabric cuttings for an inner layer and an outer layer of the deflector element used in the first example.

The structure of deflector element 130 is now explained in more detail in relation to FIGS. 7 to 10:

FIG. 7 shows the two cuttings Z1 and Z2. The inner layer of deflector element 130 hereby results from first cutting Z1, and outer layer 134 results from second cutting Z2. As can be seen, first cutting Z1 defines side recesses 133a, which in finally a mounted position are part of the radial opening 133. Cutting Z2 defines holes 135a, which in a sewn condition form radial through-holes 135.

Figure 8:
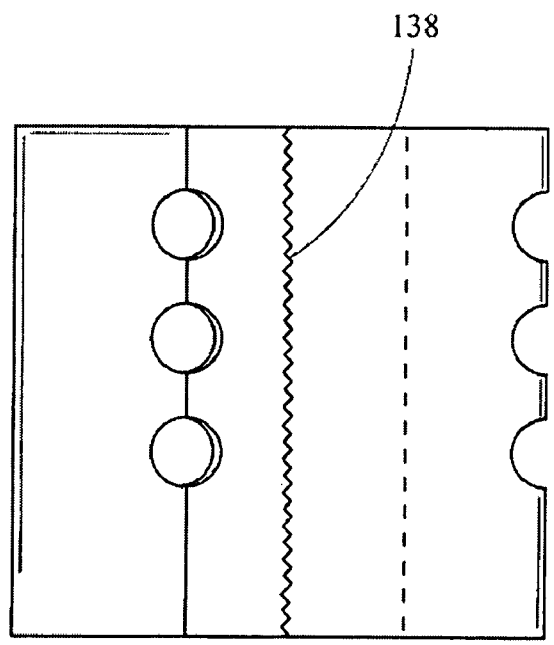
FIG. 8 is two layers of the deflector element connected by means of a second connection seam.

In a first work step shown in FIG. 8, the two cuttings Z1 and Z2 are sewn together by means of second connecting seam 138. Within this process, first cutting Z1 is sewn onto second cutting Z2 in such a way that the recesses 133a of the one longitudinal edge 32a are congruent with holes 135a. Following this, first cutting Z1 is rolled in and both longitudinal edges 134a of the outer layer are laid on one another and secured with the first connecting seam 137. Deflector element 130 is then sewn together with airbag skin 110 with fixing seam 136, which in this area can also be the circumferential seam 115. In order to be able to achieve this, second edge 134b of second cutting Z2 has to be longer than second edge 132b of first cutting Z1. Instead of forming first connecting seam 137 and fixing seam 136 separately, these can also be in the form of one single seam.

Figure 9:
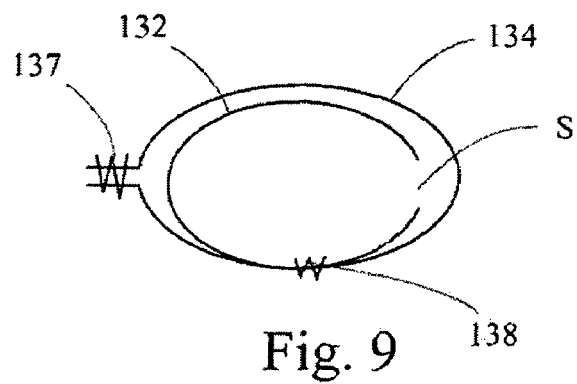
FIG. 9 is a section through the finished sewn deflector element including its first connecting seam.
Figure 10:
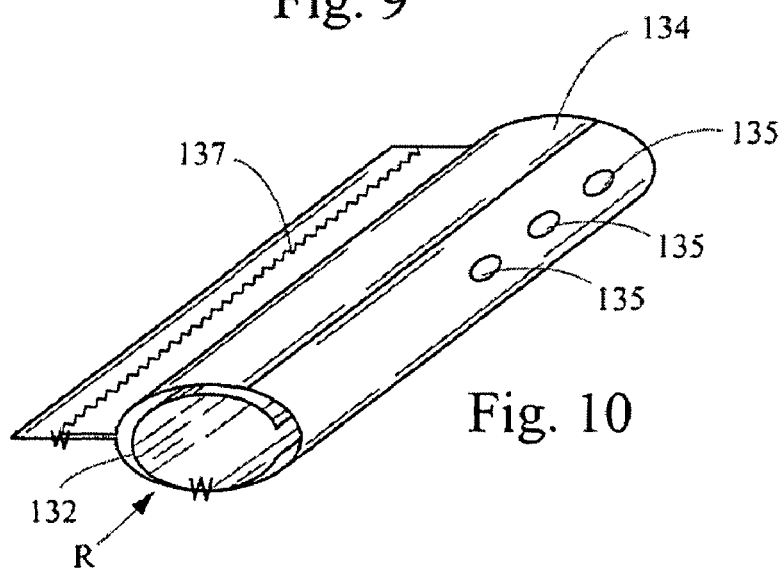
FIG. 10 is the deflector element from FIG. 4 in a perspective view.

Referring to FIGS. 9 and 10, FIG. 9 depicts a birds-eye view of FIG. 10 from Direction R. The longitudinal edges 132a of inner layer 132 (illustrated in FIG. 7) are not sewn together with one another, so that a continuous radial slit S results, which forms the radial opening together with recesses 133a (illustrated in FIG. 7).

The second connecting seam 138 may be directly affected by the gas stream in some places, but separation of this seam in some places is not harmful, as even in this case, since substantially no gas is lost. The inner and outer layers remain connected to one another and first connecting seam 137 remains covered by inner layer 132.

FIGS. 11 to 14 illustrate a second embodiment proximate the middle of the upper edge of the curtain airbag.

As in the first embodiment, inner layer 132 and outer layer 134 of deflector element 130 are each manufactured of a cutting Z1,Z2. The second cutting Z2, however, does not exhibit a through hole, whereas an oval hole L is located in first cutting Z1 (see FIG. 11).

As can be seen from FIG. 12, first cutting Z1 and second cutting Z2 are sewn together by means of a second connecting seam 138 as in the first embodiment. First cutting Z1 is rolled in and second cutting Z2 is sewn to itself at outer sections AA of its longitudinal edges 134a by means of first connecting seam 137. In the area of upper edge 111 of airbag skin 110, deflector element 130 is sewn to the airbag skin. Fixing seams 136 serve for this purpose. This is shown in FIGS. 13 and 14, whereby FIG. 13 is a section through FIG. 14 along Line IV-IV.

In the areas of outer sections AA, a fixing opening 118 is also provided for a hose clamp. The gas generator is held by means of hose clamps and by pressing the two fabric layers 132, 134 onto the jacket surface of the gas generator. Gas is sealed off in axial direction.

In contrast to the first embodiment, deflector element 130 formed of inner layer 132 and outer layer 134, is located above upper edge 111, in other words completely outside airbag skin 110. Gas generator 120, not shown, extends completely through deflector element 130. When the gas generator is activated, gas streams through oval hole L, which forms the radial opening 133 of inner layer 132, through the opening area between outer layer 134 and airbag skin 110 into the gas chamber of the airbag skin. Alternatively, an additional fabric pocket can be connected with upper edge 111 of airbag skin 110, which encloses the deflector element at least in part in order to avoid any leakage losses into the surrounding environment.

While the above description constitutes the preferred embodiment of the present invention, it will be appreciated that the invention is susceptible to modification, variation and change without departing from the proper scope and fair meaning of the accompanying claims.

The invention claimed is:

1. A tubular guide element for guiding gas coming from a gas generator into a gas chamber of an airbag, the tubular guide element comprising:
   a first fabric cutting with two substantially parallel first edges which are connected with each other by a connecting seam such that the first cutting forms the outer skin of a tube; and
   a second fabric cutting having two third edges that are disposed opposite of each other, wherein the first and second fabric cuttings are connected with each other such that the second fabric cutting is disposed inside the tube formed by the first fabric cutting and at least one of the third edges is positioned longitudinally inside the tube spaced apart from the connecting seam so that the second fabric cutting spans across and covers at least a section of the connecting seam to protect the connecting seam from being damaged by the gas from the gas generator.

2. The tubular gas guide element according to claim 1 wherein the first fabric cutting has a rectangle shape with the two first edges and two second edges.

3. The tubular gas guide element according to claim 2 wherein the second fabric cutting has a rectangle shape with the two third edges and two fourth edges.

4. The tubular gas guide element according to claim 3 wherein the first and third edges are substantially parallel to one another.

5. The tubular gas guide element according to claim 4 wherein the first and third edges lie on top of one another.

6. The tubular gas guide element according to claim 5 wherein the second and fourth edges lie on top of one another.

7. The tubular gas guide element according to claim 3 wherein the fourth edges are longer than the second edges.

8. The tubular gas guide element according to claim 6 wherein the two first edges are sewn together to form the connecting seam such that in the area of the connecting seam a first surface of the first fabric cutting lies opposite to itself.

9. The tubular gas guide element according to claim 8 wherein one of the third edges is sewn in between the two first edges.

10. The tubular gas guide element according to claim 1 wherein a plurality of through holes are provided in the first fabric cutting.

11. A tubular gas guide element according to claim 1 for use with a substantially cylindrical gas generator, which is disposed in one end of the tubular gas guide element.

12. A side curtain airbag unit comprising:

a deflector element including an inner layer and an outer layer both of which are made of fabric and are folded to form a cylindrical body which is held together by a first connecting line, the inner layer having two edges disposed opposite of each other wherein at least one of the edges of the inner layer is positioned longitudinally inside the cylindrical body spaced apart from the first connecting line so that the inner layer spans across and covers the first connecting line;

a gas generator for generating gas;

an airbag skin with an upper edge extending from a front end to a rear end, wherein an area of the upper edge located between the front and rear ends defines an accommodation area, wherein the gas generator is at least partially disposed within the deflector element and the deflector element is disposed within the accommodation area such that the gas from the gas generator is received by the accommodation area.

13. The side curtain airbag unit according to claim 12 wherein the first connecting line is one of a first connecting seam, bonded connection and welded connection.

14. The side curtain airbag unit according to claim 12 wherein the deflector element is made completely of fabric.

15. The side curtain airbag unit according to claim 12 wherein the inner layer defines at least one radial opening.

16. The side curtain airbag unit according to claim 15 wherein the outer layer defines at least one radial through hole.

17. The side curtain airbag unit according to claim 12 wherein an axis of the deflector element in a fully sewn but non-mounted state is inclined in relation to the upper edge of the airbag skin.

18. The side curtain airbag unit according to claim 12 wherein the deflector element has at least a portion disposed within the airbag skin and underneath the upper edge.

19. The side curtain airbag unit according to claim 12 wherein deflector element is located above the upper edge.

20. The tubular gas guide element according to claim 1 wherein the connecting seam is one of a sewn seam, bonded seam and welded seam.

* * * * *